(12) United States Patent
Luo et al.

(10) Patent No.: US 11,708,293 B2
(45) Date of Patent: Jul. 25, 2023

(54) GERMANOSILICATE GLASSES CONTAINING ZINC OXIDE

(71) Applicant: The Penn State Research Foundation, University Park, PA (US)

(72) Inventors: Ye Luo, State College, PA (US); John Christopher Mauro, Boalsburg, PA (US)

(73) Assignee: The Penn State Research Foundation, University Park, PA (US)

( * ) Notice: Subject to any disclaimer, the term of this patent is extended or adjusted under 35 U.S.C. 154(b) by 787 days.

(21) Appl. No.: 16/707,886

(22) Filed: Dec. 9, 2019

(65) Prior Publication Data

US 2020/0223738 A1 Jul. 16, 2020

Related U.S. Application Data

(60) Provisional application No. 62/792,108, filed on Jan. 14, 2019.

(51) Int. Cl.
*B32B 15/04* (2006.01)
*B32B 17/06* (2006.01)
*C03C 3/062* (2006.01)
*C03C 4/08* (2006.01)
*C03C 3/066* (2006.01)

(52) U.S. Cl.
CPC ............. *C03C 3/062* (2013.01); *C03C 3/066* (2013.01); *C03C 4/085* (2013.01); *C03C 2204/00* (2013.01)

(58) Field of Classification Search
CPC .................................................. C03C 2204/00
USPC ....................................................... 428/426
See application file for complete search history.

(56) References Cited

U.S. PATENT DOCUMENTS

2007/0200097 A1* 8/2007 Kishimoto ............ C03C 4/0071
252/301.33

\* cited by examiner

*Primary Examiner* — Lauren R Colgan
(74) *Attorney, Agent, or Firm* — John P. Zimmer; Nexsen Pruet, PLLC (57) ABSTRACT

A glass composition comprises a germanosilicate glass containing 5-35 mol % ZnO. The glass composition has a relatively high refractive index, good glass-forming ability, and UV-shielding properties.

21 Claims, 8 Drawing Sheets

GERMANOSILICATE GLASSES CONTAINING ZINC OXIDE

CROSS-REFERENCE TO RELATED APPLICATIONS

This application claims priority under 35 U.S.C. § 119(e) to U.S. Provisional Patent Application No. 62/792,108, filed Jan. 14, 2019, the entirety of which is incorporated by reference herein.

FIELD

The invention is generally related to germanosilicate glass, and, more particularly, to ZnO-containing germanosilicate glass for optical applications.

BACKGROUND

Germanosilicate glasses are well known for their high transparency in both the visible and near infrared regions, making them desirable materials for the fabrication of fiber and planar waveguides. Germanosilicate glasses combine the advantages of relatively lower phonon energy and higher refractive index of germanate glasses together with the lower cost and higher chemical stability of silicate glasses. Recently, there has been growing interest in germanosilicate glasses due to their photosensitivity, luminescent properties and nonlinear optical properties. For instance, $Er^{3+}$-doped germanosilicate glass for optical amplifiers have been developed, and $Tm^{3+}$-doped germanosilicate glass and $Cr^{3+}$-doped lead niobium germanosilicate glasses have been explored as potential candidates for solid-state lasers. Additionally, the effect of ionizing radiation on Bi-doped germanosilicate fibers in the near-IR region has also been reported.

Silica and germania are two of the most commonly studied network glasses, composed of $SiO_4/GeO_4$ tetrahedral units connected with bridging O at the corners. The network of germanosilicate glasses has $SiO_2$-like, $GeO_2$-like, and mixed $SiO_2$—$GeO_2$-like regions. The structure can be described as a random network of $GeO_4$ and $SiO_4$ tetrahedra. The bond length and bond angle distribution in $GeO_2$ are similar to that in $SiO_2$, but the Ge—O bonds are weaker and less stable than Si—O bonds. When modifier oxides such as alkali oxides are added to germanosilicate glasses, the larger radius of Ge atoms can transform from four-fold to six-fold coordination, leading to a nonlinear variation in glass properties with compositions.

Germanosilicate glasses are essential in the manufacture of optical amplifiers, waveguides, and solid-state lasers. However, previous germanosilicate glasses fail to provide desired combinations of properties for some optical applications. Therefore, improved germanosilicate glasses are desired, including for optical applications.

SUMMARY

In one aspect, compositions comprising glass are described herein which, in some embodiments, provide one or more advantages compared to other glasses or glass compositions. For example, in some cases, a composition described herein comprises a glass having a relatively high refractive index, good glass-forming ability, and UV-shielding properties.

A composition described herein, in some embodiments, comprises a germanosilicate glass containing 5-35 mol % ZnO. In some cases, the glass contains 10-30 mol % ZnO or 15-25 mol % ZnO. Moreover, in some instances, a glass described herein has a molar composition of $aK_2O$-$bZnO$-$cGeO_2$-$dSiO_2$, where a, b, c, and d are mole percents. Further, the sum of a, b, c, and d is between 95 and 100; a is between 5 and 35; b is between 5 and 35; c is between 25 and 55; and d is between 5 and 35. In some such cases, a is between 10 and 30; b is between 10 and 30; c is between 30 and 50; and d is between 10 and 30. In still other embodiments, a is between 15 and 25; b is between 15 and 25; c is between 35 and 45; and d is between 15 and 25. In addition, in some cases, the glass of a composition described herein does not comprise a lanthanide or lanthanide compound. For example, in some instances, the glass does not comprise holmium or thulium.

Further, the glass of a composition described herein can have or exhibit a variety of desirable properties, including for optical applications. In some embodiments, for instance, the glass of a composition described herein has a density of 3.1 to 3.5 g/cm$^3$. In some cases, a glass described herein has a refractive index of 1.5 to 1.7. The glass of a composition described herein may also have a UV cut-off edge greater than 300 nm, such as a UV cut-off edge between 300 and 350 nm. In some embodiments, a glass described herein has a thermal expansion coefficient of $100 \times 10^{-7}$ to $150 \times 10^{-7}/°$ C. The glass of a composition described herein can also have a high optical transparency. For example, in some cases, a glass described herein has an average optical transmittance from 390 to 700 nm of at least 75% at a thickness of 2 mm, or an average optical transmittance from 390 to 700 nm of 80 to 90% at a thickness of 2 mm. Moreover, in some instances, the glass of a composition described herein has an optical reflectance of no greater than 0.07, when determined according to Equation (3) hereinbelow. In some embodiments, the glass has an optical reflectance of 0.05 to 0.06, when determined according to Equation (3). Further, a glass described herein, in some cases, can have a glass transition temperature ($T_g$) of 450-600° C., when determined according to the Mauro-Yue-Ellison-Gupta-Allen (MYEGA) equation. Additionally, in some embodiments, the glass of a composition described herein has a fragility (m) of no greater than 50, when determined according to Equation (5) hereinbelow. In some cases, such a glass has a fragility of 40 to 50, when determined according to Equation (5). Moreover, in some embodiments, a glass described herein has a melting temperature of 1400-1600° C. ($T_{melt}$) and/or an annealing temperature ($T_{anneal}$) of 450-600° C. In some particularly preferred embodiments, the glass of a composition described herein has a density of 3.1 to 3.5 g/cm$^3$; a refractive index of 1.5 to 1.7; a UV cut-off edge greater than 300 nm; a thermal expansion coefficient of $100 \times 10^{-7}$ to $150 \times 10^{-7}/°$ C.; an average optical transmittance from 390 to 700 nm of at least 75% at a thickness of 2 mm; an optical reflectance of no greater than 0.07, when determined according to Equation (3); a glass transition temperature ($T_g$) of 450-600° C., when determined according to the Mauro-Yue-Ellison-Gupta-Allen (MYEGA) equation; a fragility (m) of no greater than 50, when determined according to Equation (5); a melting point of 1400-1600° C. ($T_{melt}$); and an annealing temperature ($T_{anneal}$) of 450-600° C.

In another aspect, optical components are described herein. Such an optical component can be formed from any glass or composition described in the present disclosure, including hereinabove. Moreover, in some embodiments, the optical component is a lens, such as a lens for use in a laser-based application.

DETAILED DESCRIPTION

Embodiments described herein can be understood more readily by reference to the following detailed description, examples, and figures. Elements, apparatus, and methods described herein, however, are not limited to the specific embodiments presented in the detailed description, examples, and figures. It should be recognized that these embodiments are merely illustrative of the principles of the current invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9. Similarly, a stated range of "1 to 10" should be considered to include any and all subranges beginning with a minimum value of 1 or more and ending with a maximum value of 10 or less, e.g., 1 to 4, or 2 to 10, or 3 to 9, or 5 to 8.

All ranges disclosed herein are also to be considered to include the end points of the range, unless expressly stated otherwise. For example, a range of "between 5 and 10" or "from 5 to 10" or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

In an aspect, a composition comprises a germanosilicate glass containing 5-35 mol % ZnO. In some embodiments, the glass contains 8-35 mol %, 10-30 mol % 12-28 mol %, 15-25 mol %, 18-22 mol %, 10-35 mol %, 12-35 mol %, 15-35 mol %, 18-35 mol %, 20-35 mol %, 22-35 mol %, 25-35 mol %, 28-35 mol %, 30-35 mol %, 8-32 mol %, 8-30 mol %, 8-27 mol %, 8-25 mol %, 8-25 mol %, 8-22 mol %, 8-19 mol %, 8-16 mol %, 8-14 mol %, 8-12 mol %, 8 mol %, 10 mol %, 13 mol %, 15 mol %, 18 mol %, 20 mol %, 23 mol %, 25 mol %, 28 mol %, 31 mol %, 33 mol %, or 35 mol % ZnO.

In some embodiment, a composition described herein is has a molar composition of $aK_2O$-$bZnO$-$cGeO_2$-$dSiO_2$, where a, b, c, and d are mole percents (mol %), and the sum of a, b, c, and d is between 95 and 100. In some embodiments, a is between 5 and 35 mol %, 8 and 35 mol %, 10 and 30 mol %, 12 and 28 mol %, 15 and 25 mol %, 18 and 22 mol %, 10 and 35 mol %, 12 and 35 mol %, 15 and 35 mol %, 18 and 35 mol %, 20 and 35 mol %, 22 and 35 mol %, 25 and 35 mol %, 28 and 35 mol %, 30 and 35 mol %, 8 and 32 mol %, 8 and 30 mol %, 8 and 27 mol %, 8 and 25 mol %, 8 and 25 mol %, 8 and 22 mol %, 8 and 19 mol %, 8 and 16 mol %, 8 and 14 mol %, 8 and 12 mol %, 5 mol %, 8 mol %, 10 mol %, 13 mol %, 15 mol %, 18 mol %, 20 mol %, 23 mol %, 25 mol %, 28 mol %, 31 mol %, 33 mol %, or 35 mol %.

In some cases, b is between 5 and 35 mol %, 8 and 35 mol %, 10 and 30 mol %, 12 and 28 mol %, 15 and 25 mol %, 18 and 22 mol %, 10 and 35 mol %, 12 and 35 mol %, 15 and 35 mol %, 18 and 35 mol %, 20 and 35 mol %, 22 and 35 mol %, 25 and 35 mol %, 28 and 35 mol %, 30 and 35 mol %, 8 and 32 mol %, 8 and 30 mol %, 8 and 27 mol %, 8 and 25 mol %, 8 and 25 mol %, 8 and 22 mol %, 8 and 19 mol %, 8 and 16 mol %, 8 and 14 mol %, 8 and 12 mol %, 8 mol %, 10 mol %, 13 mol %, 15 mol %, 18 mol %, 20 mol %, 23 mol %, 25 mol %, 28 mol %, 31 mol %, 33 mol %, or 35 mol %.

In some embodiments, c is between 25 and 55; 30 and 50, 33 and 48, 35 and 45, 38 and 42, 25 and 50, 25 and 47, 25 and 44, 25 and 41, 25 and 38, 25 and 35, 25 and 33, 25 and 30, 30 and 55, 33 and 55, 35 and 55, 37 and 55, 40 and 55, 42 and 55, 44 and 55, 47 and 55, 49 and 55, 25 mol %, 27 mol %, 30 mol %, 32 mol %, 35 mol %, 38 mol %, 40 mol %, 42 mol %, 45 mol %, 48 mol %, 50 mol %, 52 mol %, or 55 mol %. In some cases, d is between 5 and 35 mol %, 8 and 35 mol %, 10 and 30 mol %, 12 and 28 mol %, 15 and 25 mol %, 18 and 22 mol %, 10 and 35 mol %, 12 and 35 mol %, 15 and 35 mol %, 18 and 35 mol %, 20 and 35 mol %, 22 and 35 mol %, 25 and 35 mol %, 28 and 35 mol %, 30 and 35 mol %, 8 and 32 mol %, 8 and 30 mol %, 8 and 27 mol %, 8 and 25 mol %, 8 and 22 mol %, 8 and 19 mol %, 8 and 16 mol %, 8 and 14 mol %, 8 and 12 mol %, 5 mol %, 8 mol %, 10 mol %, 13 mol %, 15 mol %, 18 mol %, 20 mol %, 23 mol %, 25 mol %, 28 mol %, 31 mol %, 33 mol %, or 35 mol %.

In an embodiment, compositions described herein comprise a being between 5 and 35; b being between 5 and 35; c being between 25 and 55; and d being between 5 and 35. In another embodiment, compositions described herein comprise a being between 10 and 30; b being between 10 and 30; c being between 30 and 50; and d being between 10 and 30. In yet another embodiment, compositions described herein comprise a being between 15 and 25; b being between 15 and 25; c being between 35 and 45; and d being between 15 and 25.

In some cases, the compositions comprise a glass that is free of a lanthanide or lanthanide compound. In some instances, the glass is free of holmium or thulium. Further still, in some embodiments, the glass is free from lanthanide, a lanthanide compound, holmium, and/or thulium.

In some embodiments, compositions described herein comprise a glass having any density not inconsistent with the objectives of this disclosure. In some cases, the glass has a density of 3.1 to 3.5 g/cm$^3$, 3.2 to 3.5 g/cm$^3$, 3.3 to 3.5 g/cm$^3$, 3.1 to 3.4 g/cm$^3$, 3.1 to 3.3 g/cm$^3$, 3.1 g/cm$^3$, 3.2 g/cm$^3$, 3.3 g/cm$^3$, 3.4 g/cm$^3$, or 3.5 g/cm$^3$.

A composition described herein can comprise a glass having any refractive index not inconsistent with the objectives of this disclosure. In some instances, the glass has a refractive index of 1.5 to 1.7, 1.5, 1.6, or 1.7.

A composition described herein can comprise a glass having a UV cut-off edge of greater than 300 nm. In some embodiments, the UV cut-off edge is between 300-350 nm, 310-340 nm, 320-330 nm, 310-350 nm, 315-350 nm, 320-350 nm, 325-350 nm, 330-350 nm, 335-350 nm, 340-350 nm, at least 300 nm, at least 305 nm, at least 310 nm, at least 315 nm, at least 320 nm, at least 325 nm, at least 330 nm, at least 335 nm, at least 340 nm, at least 345 nm, or at least 350 nm.

In some cases, a composition can comprise a glass with a thermal expansion coefficient of $100\times10^{-7}$ to $150\times10^{-7}$/° C., $110\times10^{-7}$ to $150\times10^{-7}$/° C., $120\times10^{-7}$ to $150\times10^{-7}$/° C., $130\times10^{-7}$ to $150\times10^{-7}$/° C., $140\times10^{-7}$ to $150\times10^{-7}$/° C., $100\times10^{-7}$ to $140\times10^{-7}$/° C., $100\times10^{-7}$ to $130\times10^{-7}$/° C., $100\times10^{-7}$ to $120\times10^{-7}$/° C., $100\times10^{-7}$ to $110\times10^{-7}$/° C., $110\times10^{-7}$ to $140\times10^{-7}$/° C., $115\times10^{-7}$ to $135\times10^{-7}$/° C., or $120\times10^{-7}$ to $130\times10^{-7}$/° C.

A composition described herein can comprise a glass having an average optical transmittance from 390 to 700 nm of at least 75%, at least 80%, at least 85%, or at least 90%, between 75-90%, 80-90%, or 85-90% at a thickness of 2 mm.

In some embodiments, a composition comprises a glass having an optical reflectance of no greater than 0.07 no greater than 0.06, no greater than 0.05, or between 0.05 to 0.06, when determined according to Equation (3). Equation (3) is described in more detail below in the Examples.

A composition described herein comprises a glass having a glass transition temperature ($T_g$) of 450-600° C., 465-600° C., 475-600° C., 485-600° C., 495-600° C., 500-600° C., 510-600° C., 515-600° C., 525-600° C., 535-600° C., 545-600° C., 555-600° C., 565-600° C., 575-600° C., 585-600° C., 450-575° C., 450-550° C., 450-525° C., 450-500° C., 450-475° C., 450° C., 475° C., 500° C., 525° C., 550° C., 575° C., or 600° C., when determined according to the Mauro-Yue-Ellison-Gupta-Allen (MYEGA) equation. The MYEGA equation is described in more detail below in the Examples.

In some cases, a composition described herein comprises a glass having a fragility (m) of no greater than 50, no greater than 47, no greater than 45, not greater than 43, no greater than 40, between 40-50, between 42-50, between 44-50, between 46-50, between 48-50, between 40-48, between 40-46, between 40-44, or between 40-42, when determined according to Equation (5). Equation (5) is described in more detail below in the Examples.

In some embodiments, a composition described herein comprises a glass having a melting temperature ($T_{melt}$) of 1400-1600° C., 1450-1600° C., 1500-1600° C., 1550-1600° C., 1400-1550° C., 1400-1500° C., or 1400-1450° C., and/or an annealing temperature ($T_{anneal}$) of 450-600° C., 475-600° C., 500-600° C., 525-600° C., 550-600° C., 450-575° C., 450-550° C., 450-525° C., 450-500° C., or 450-475° C.

In another aspect, optical components are described herein. Such an optical component can be formed from any composition described herein. For example, in some cases, an optical component can be formed from a glass made of a composition described herein. Moreover, in some embodiments, the optical component is a lens, such as a lens for use in a laser-based application.

Additional aspects of compositions and methods of this disclosure are further illustrated in the following non-limiting examples.

Example 1

Preparation of $K_2O$—$ZnO$—$GeO_2$—$SiO_2$ Compositions

Thirteen exemplary, non-limiting samples centered around a molar composition of $20K_2O$-$20ZnO$-$40GeO_2$-$20SiO_2$ were formed, and the composition-property relationships were determined. The densities are in the range of 3.18-3.46 g/cm$^3$ and the refractive index values (RI) are between 1.588 and 1.630, close to the RI of pure $GeO_2$ (1.603). Density and RI values increase with $GeO_2$ and $SiO_2$ concentrations. The UV cut-off edge is between 313 and 320 nm, significantly higher than the 157 nm value in typical soda lime glass. Fragility (m) and glass transition temperature ($T_g$) were determined by fitting viscosity data with the MYEGA equation. The $T_g$ from the MYEGA equation is in good agreement with $T_g$ values from DSC. Thermal expansion coefficients of samples are in the range of 102.7 to 139.2×10$^{-7}$/° C., mainly influenced by the amount of ZnO and $K_2O$. These samples have relatively high refractive index, high transparency, good glass-forming ability, and good UV-shielding properties, making them suitable for lens applications (including for lasers).

As stated above, a group of thirteen samples centered around a molar composition of $20K_2O$-$20ZnO$-$40GeO_2$-$20SiO_2$ were made in alumina crucibles by a melt-quenching technique. $K_2O$ was added to decrease melting temperature and introduce non-bridging oxygens.

Figure 1:
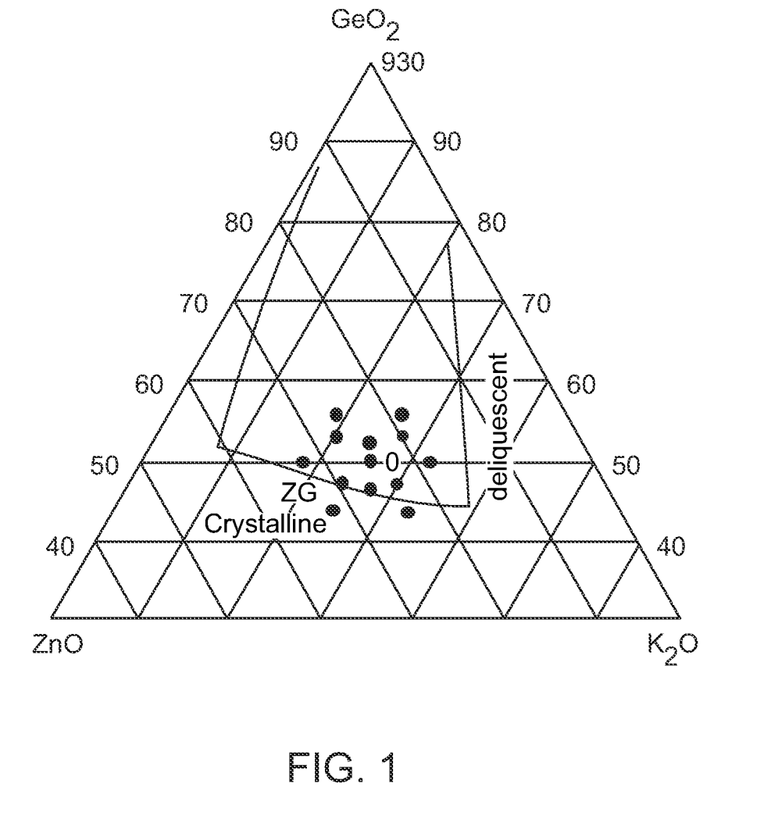
FIG. 1 is a phase diagram of $GeO_2$—ZnO—$K_2O$ and thirteen exemplary compositions.

$K_2O$—$ZnO$—$GeO_2$—$SiO_2$ glasses were prepared using powders of $GeO_2$ (Changsha Santech Materials Co. Ltd, China, 99.999%), $SiO_2$ (Alfa Aesar, USA, 99%), ZnO (Acros Organics, USA, 99.5+%), and $K_2CO_3$ (Alfa Aesar, USA, 99%). The central molar composition of $20K_2O$-$20ZnO$-$40GeO_2$-$20SiO_2$ was determined based on the phase diagram of $GeO_2$—$ZnO$—$K_2O$ (FIG. 1). A design of experiments was constructed using ±5 mol % of different oxides to prepare twelve additional samples. The compositions and abbreviations (for example, GS represents 5 mol % more $GeO_2$ and 5 mol % less $SiO_2$ compared with the central composition) are listed in Table 1 below. The mixtures of 100 g powders were melted in alumina crucibles at 1450° C. and kept at the melting temperature for 1 h for homogenization and fining. Molten glasses were poured onto a stainless-steel plate, annealed at 500° C. for at least 8 h, and slowly cooled to room temperature in order to release thermal stress. Due to a crystallized phase existing in the high ZnO sample (ZG), a melting temperature of 1550° C. and annealing temperature of 550° C. were used for the ZS and ZK samples.

TABLE 1

Compositions, melting temperatures, and annealing temperatures of thirteen exemplary glass compositions.

| Ab. | Composition (mol %) | $T_{melt}$ (° C.) | $T_{anneal}$ (° C.) | State |
|---|---|---|---|---|
| O | 20K$_2$O—20ZnO—40GeO$_2$—20SiO$_2$ | 1450 | 500 | Glass |
| GS | 20K$_2$O—20ZnO—45GeO$_2$—15SiO$_2$ | 1450 | 500 | Glass |
| GZ | 20K$_2$O—15ZnO—45GeO$_2$—20SiO$_2$ | 1450 | 500 | Glass |
| GK | 15K$_2$O—20ZnO—45GeO$_2$—20SiO$_2$ | 1450 | 500 | Glass |
| SG | 20K$_2$O—20ZnO—35GeO$_2$—25SiO$_2$ | 1450 | 500 | Glass |
| SZ | 20K$_2$O—15ZnO—40GeO$_2$—25SiO$_2$ | 1450 | 500 | Glass |
| SK | 15K$_2$O—20ZnO—40GeO$_2$—25SiO$_2$ | 1450 | 500 | Glass |
| ZG | 20K$_2$O—25ZnO—35GeO$_2$—20SiO$_2$ | 1450 | 500 | Glass/Crystal |
| ZS | 20K$_2$O—25ZnO—40GeO$_2$—15SiO$_2$ | 1550 | 550 | Glass |
| ZK | 15K$_2$O—25ZnO—40GeO$_2$—20SiO$_2$ | 1550 | 550 | Glass |
| KG | 25K$_2$O—20ZnO—35G$_2$O$_2$—20SiO$_2$ | 1450 | 500 | Glass |
| KS | 25K$_2$O—20ZnO—40GeO$_2$—15SiO$_2$ | 1450 | 500 | Glass |
| KZ | 25K$_2$O—15ZnO—40GeO$_2$—20SiO$_2$ | 1450 | 500 | Glass |

Several pieces from the poured samples were mounted in epoxy resin and measured by Electron Probe Micro Analyzer (EPMA, Cameca SX-5) to determine the amount of alumina dissolved in the sample and evaporation of different volatile phases in the compositions. X-ray diffraction (XRD) patterns (2θ from 10° to 90°) for the crystallized phase in ZG were obtained using PANalytical Empryean X-Ray Diffractometer with Cu K$_\alpha$ radiation (40 kV & 40 mA) source.

Densities of five different pieces in each sample were measured using Archimedes method with distilled water as liquid medium at room temperature, and error bars were calculated. Glass samples were milled and immersed in index-matching oil (made by Cargille Labs) under an optical microscope. Becke lines were observed to compare the refractive index of the unknown samples with known liquids. The minimum division value of different oils is 0.002.

Ultraviolet-visible (UV-VIS) transmittance spectra were obtained for optically polished glass samples of equal thickness (2±0.1 mm) using Perkin-Elmer Lambda 950 UV-Vis-NIR Spectrophotometer covering the range from 250 to 800 nm.

Glass transition temperature ($T_g$) was obtained from both differential scanning calorimetry (DSC) and rotating cylinder viscometry. DSC measurements performed heat-cool-heat experiments at 10° C./min using an SDT Q600 instrument from TA Instruments. The cooling processes provided a known thermal history, and $T_g$ values were recorded as the intersection of two tangent lines in glass transition range. Viscosity-temperature parameters were measured using a rotational viscometer (VIS 403, TA Instruments) at 5 K/min cooling rate in the range of $10^{0.7}$-$10^{6.6}$ Pa·s. All the data were fitted with the Mauro-Yue-Ellison-Gupta-Allan (MYEGA) equation, providing the information of $T_g$ and fragility (m). The $\log_{10} \eta_\infty$ value of −2.93, predicted by MYEGA equation, was used in the fitting.

Linear thermal expansion coefficients (CTE) of samples were obtained using a Thermomechanical Analyzer (TMA Q400, TA Instruments). The samples were ground to 4×4×6 mm and heated from room temperature to 100° C. with 5° C./min. Dimensional change per height divided by temperature was recorded under 0.0500 N force.

Example 2

XRD and EPMA Results

Figure 2:
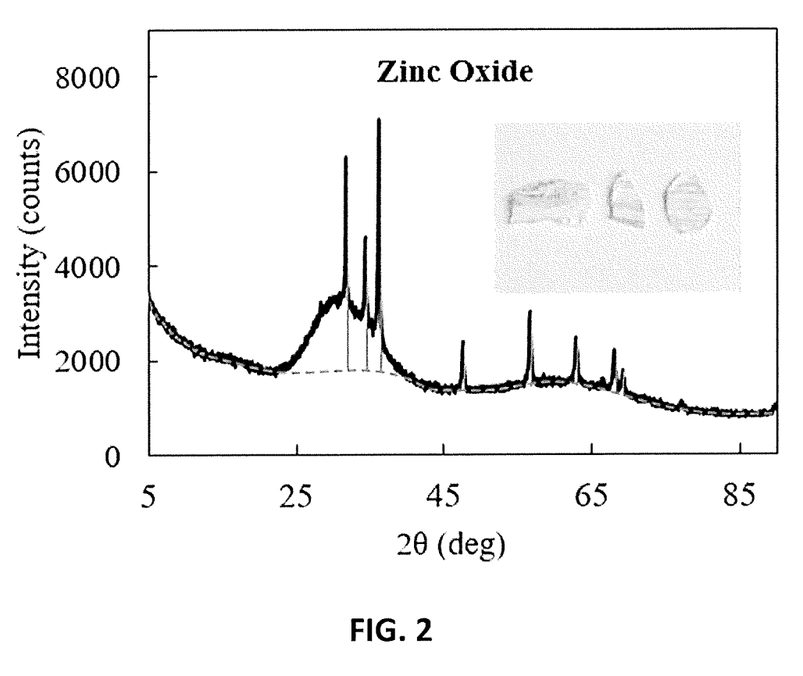
FIG. 2 is an x-ray diffraction (XRD) spectrum of white phase in a sample ZG, with several sharp peaks of ZnO superimposed on the broad vitreous band.

In all thirteen samples prepared in Example 1, only sample ZG had a white crystallized phase, and the color of white phase surface gradually changed to yellow after one week. FIG. 2 shows the X-ray diffraction pattern of the white phase. Several sharp peaks of ZnO are superimposed on the broad vitreous peak. ZnO, when placed on oxide substrates and exposed in air, can react with moisture and $CO_2$ to form amorphous $ZnCO_3$, explaining the color change on the surface. Due to the lack of any crystallized phase in the ZS and ZK samples (which were melted at 1550° C.), 25 mol % ZnO is considered to be supersaturated at 1450° C. The supersaturation of ZnO and the extra addition of $SiO_2$ explain that glass samples were made at points in the crystallized region of the phase diagram in FIG. 1.

From EPMA results, the concentration of ZnO in sample ZG is 22.4 mol %. The differences between compositions of glasses and powders in other samples are less than 1.5 mol %, mainly caused by evaporation of different volatile phases. EPMA results also show that less than 1 mol % of $Al_2O_3$ dissolved from the alumina crucibles.

Example 3

Densities And Refractive Index Values

Figure 3:
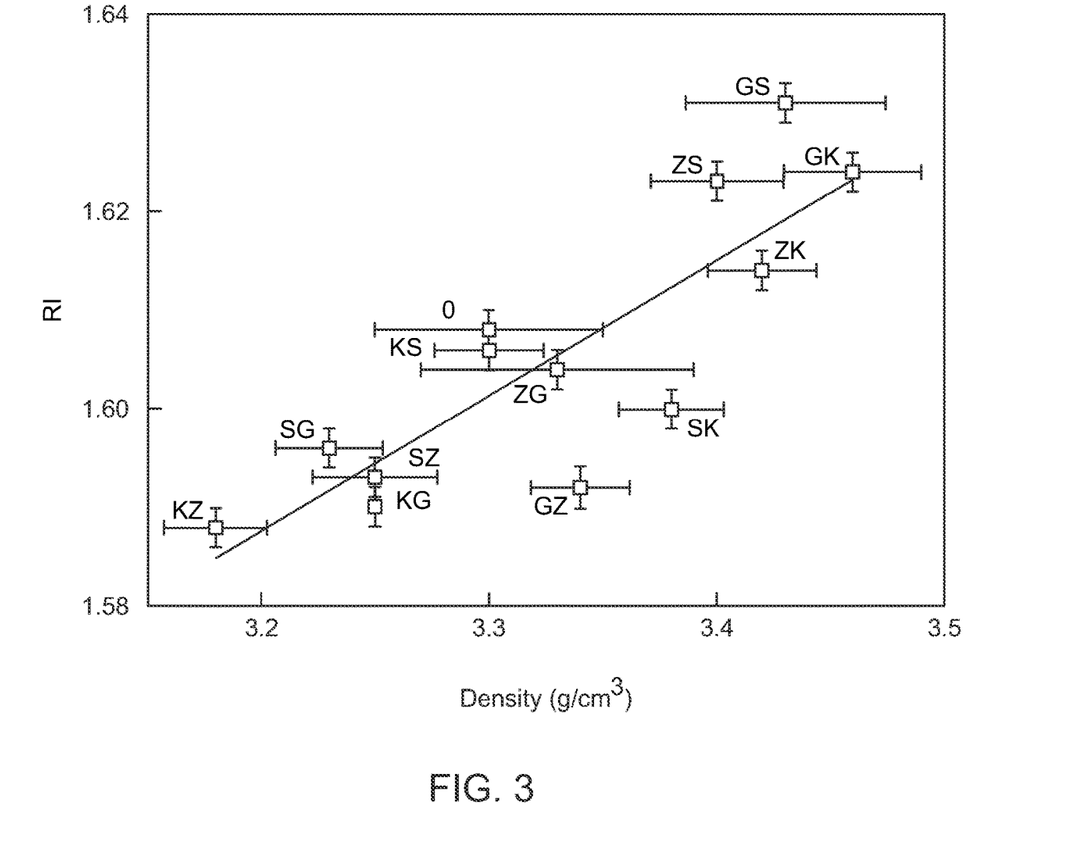
FIG. 3 is a graph of densities to refractive index values of exemplary compositions, where higher densities have higher refractive index values.

The densities of the samples prepared in Example 1 are in the range from 3.18 to 3.46 g/cm$^3$, between that of pure $GeO_2$ glass (3.604 g/cm$^3$) and $SiO_2$ glass (2.202 g/cm$^3$). The refractive index values of the samples are in the range of 1.588 to 1.630, close to the refractive index of pure $GeO_2$ glass (1.605) and significantly higher than the refractive index of common soda lime silicate glass (1.51-1.52). FIG. 3 shows the relation between density and refractive index in this set of glasses. Samples with higher densities have relatively higher refractive index values.

Figure 4:
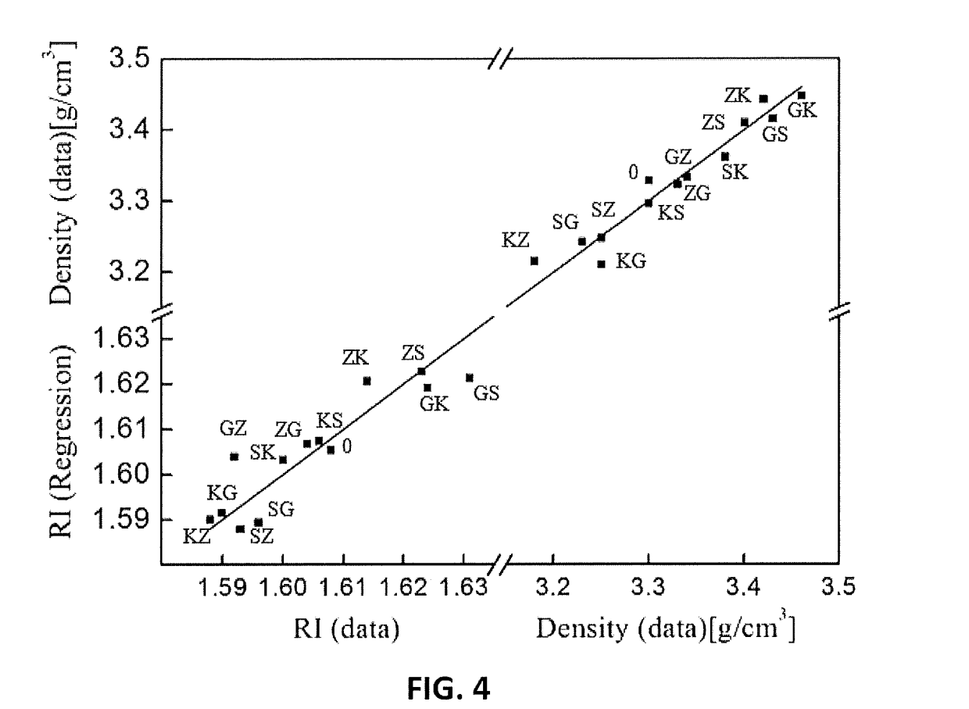
FIG. 4 is a graph of comparative data predicted by linear regression and experimental results.

Multiple linear regressions were used to predict the influence of different compositions to densities and refractive index values. The equations are shown below.

$$\rho(\text{g/cm}^3) = 2.4435 + 0.0173[\text{GeO2}] + 0.0163[\text{ZnO}] - 0.0065[\text{K2O}] \quad (1)$$

$$n = 1.3993 + 0.0032[\text{GeO2}] + 0.0035[\text{ZnO}] + 0.0004[\text{K2O}] \quad (2)$$

where ρ is the density, and n is refractive index. 2.4435 g/cm$^3$ and 1.3993 are the density and refractive index, respectively, of pure silicate glass predicted by multiple linear regression. The percentage errors between predicted densities and refractive index coefficients and experimental data (2.20 g/cm$^3$ in density, 1.457 in refractive index) are 11.1% and 4.0%, respectively. The errors are mainly due to the simplified linear models used for the relations between the properties and compositions. FIG. 4 shows the comparison of data predicted by linear regressions with the experimental results. $R^2$ of the density fit is 0.94, which indicates that 94% of the variability in density can be explained by linear variations with composition. $R^2$ of refractive index is 0.83. P-values, which are the actual probabilities of incorrectly rejecting the null hypothesis, for $GeO_2$ and ZnO are less than 0.001, while the P-value for $K_2O$ is more than 0.1. The linear regression results show that the density and refractive index, compared with pure silicate glass, increase with more $GeO_2$ and ZnO. $K_2O$ has less impact on density and refractive index.

Example 4

Transmittances and Cut-Off Edges

Figure 5A:
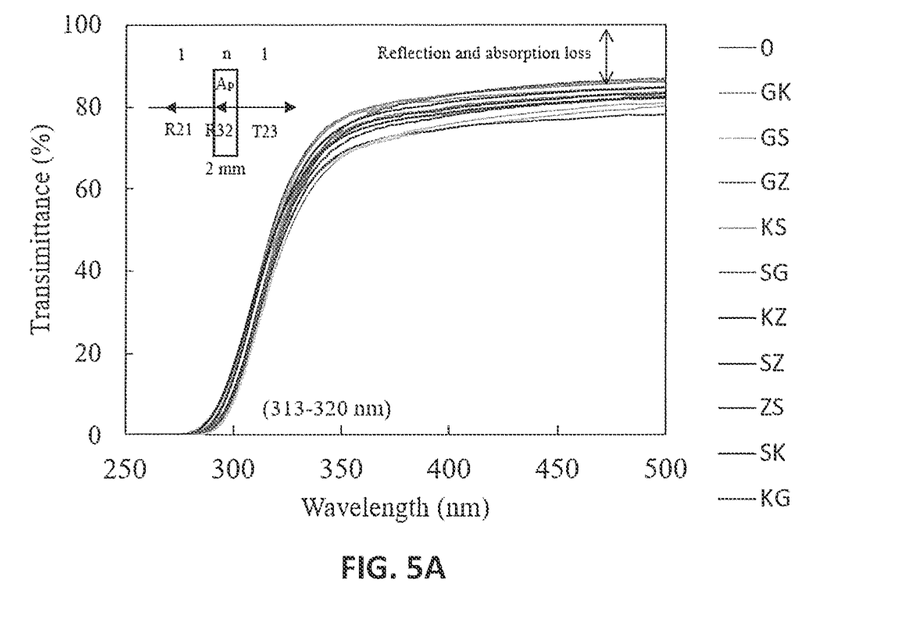
FIG. 5A is a graph of UV-Vis spectra of different exemplary compositions.
Figure 5B:
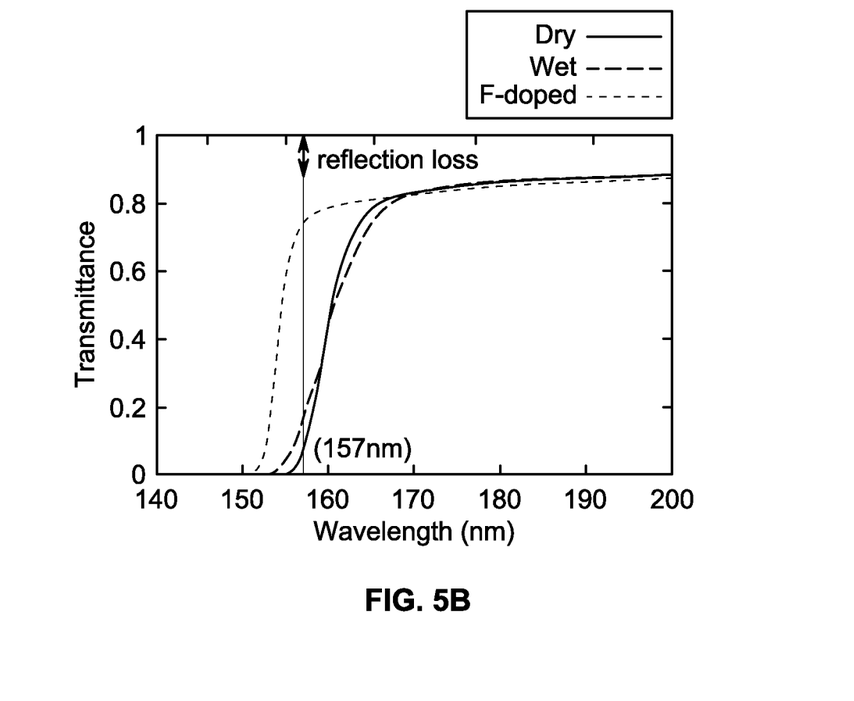
FIG. 5B is a graph of reflection and absorption losses of different exemplary compositions.

FIG. 5 shows the transmittances and cut-off edges of the samples of Example 1 from UV-Vis results. The average transmittances of samples in the visible light region (390-700 nm) are between 80.8% and 86.3%. The transmittance decreases with shorter wavelength. The loss of transparency is due to the percent of absorption ($A_p$ in FIG. 5) and reflections from both surfaces of glass samples ($R_{21}$ and $R_{32}$ in FIG. 5). The relation between reflection and refractive index follows the equation below.

$$R = \frac{(n_{glass} - n_{air})^2}{(n_{glass} + n_{air})^2} \quad (3)$$

where R is the reflectance, and $n_{glass}$ and $n_{air}$ are the refractive index of glass and air, respectively. Reflectance increases with a higher refractive index. Using data of refractive index from Example 3, the reflectance of the samples is in the range from 0.0516 to 0.0574. Due to small reflectance, lights from multiple reflections of two glass surfaces are negligible. The relation of transmittance (T), reflectance (R), and absorption ($A_P$) is shown in the equation below.

$$T+A_P+(1-A_P-R)\times R+R=1 \quad (4)$$

The absorption percent of samples are in the range between 3.8% to 8.8%. Absorption is proportional to the thickness of samples according to the Beer-Lambert law. Therefore, the absorptions per mm are in the range of 1.9% to 4.4%.

The cut-off edges in the UV region are in the range from 313 to 320 nm, significantly higher compared with 157 nm in typical soda lime glass. These results show that most UV light can be absorbed in these samples. The cut-off behavior is determined by direct electronic transitions from the valance band to the conduction band. The shift of cut-off edges to visible light region are mainly determined by the direct optical bandgap of ZnO.

Example 5

Glass Transition Behavior

Figure 6A:
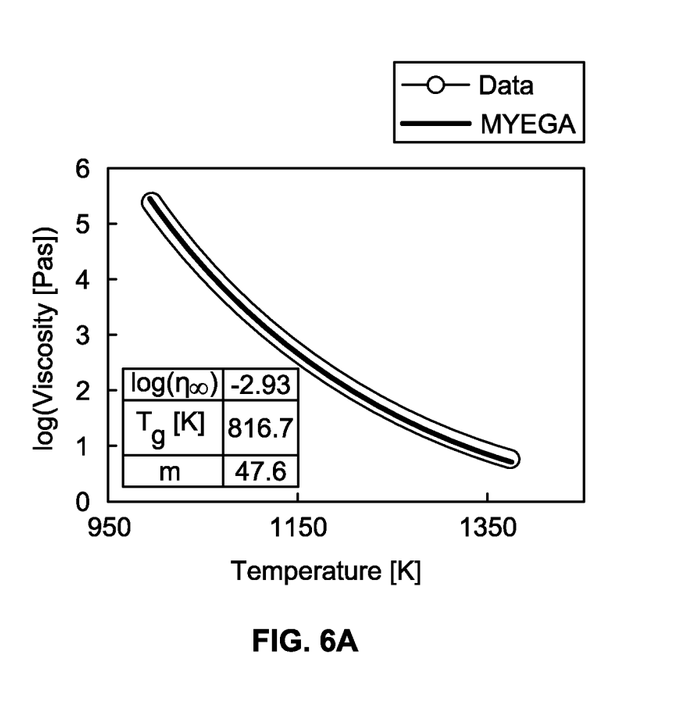
FIG. 6A is a graph of a viscosity-temperature curve of an exemplary composition obtained from high-temperature viscometry and fitted with the Mauro-Yue-Ellison-Gupta-Allen (MYEGA) equation.
Figure 6B:
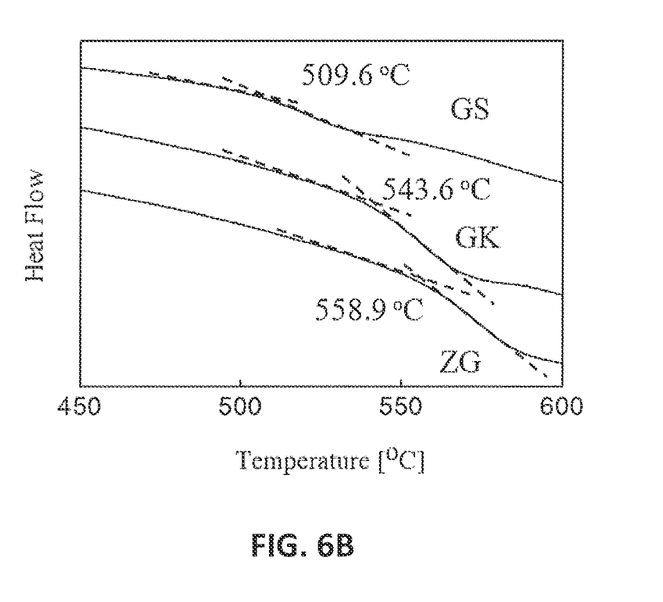
FIG. 6B is a graph of glass transition temperatures ($T_g$) obtained from DSC curves for different exemplary compositions.
Figure 6C:
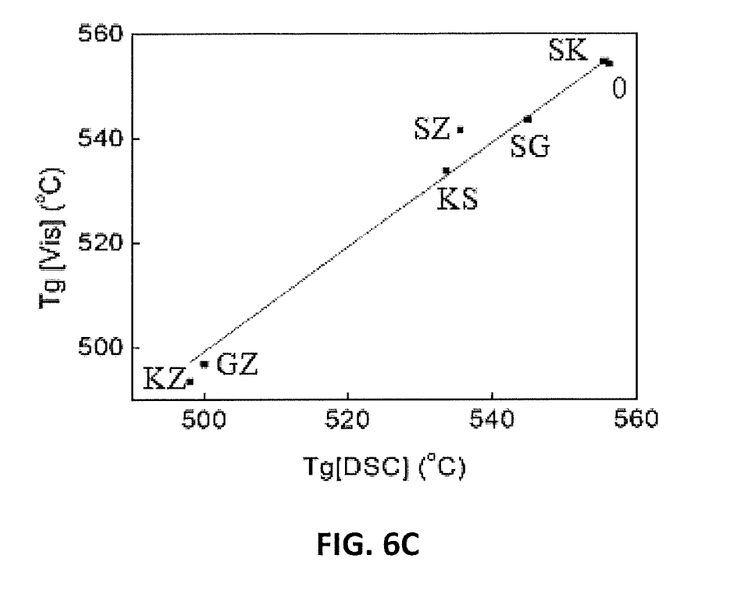
FIG. 6C is a graphical comparison of Tg obtained from the fitted viscometry data of FIG. 6A and the DSC curves of FIG. 6B.

FIG. 6A shows the viscosity-temperature curve of sample SG obtained from rotating cylinder viscometry. The data are well fit with the MYEGA equation, and the standard deviations of the data are less than 0.4. Glass transition behavior is the kinetic process changing from a supercooled liquid state to the glassy state. Glass transition depends on the thermal history and kinetic processes during glass formation. Glass transition temperatures ($T_g$) obtained from the MYEGA equation are compared with $T_g$ measured from DSC curves (FIG. 6B). The differences in $T_g$ of different samples obtained from these two methods are less than 5° C., which is shown in FIG. 6C. $SiO_2$ and ZnO tend to increase $T_g$ while $GeO_2$ and $K_2O$ decrease $T_g$.

Figure 6D:
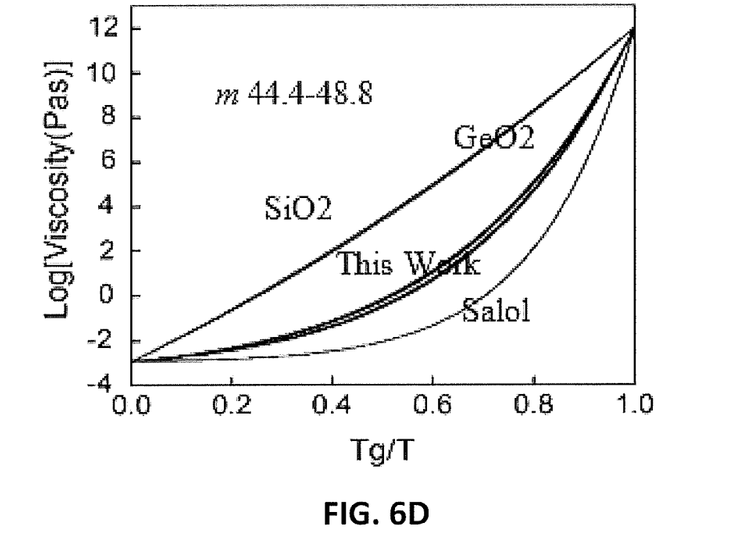
FIG. 6D is a graph of fragilities (m) obtained from the MYEGA equations of FIG. 6A plotted in an Angell plot.

Fragility (m), which can help us understand liquid dynamics and glass transition behaviors, obtained from MYEGA equation, are plotted in the Angell plot. The equation for fragility is shown below.

$$m = \frac{d\log(\eta)}{d(T_g/T)}\bigg|_{T=T_g} \quad (5)$$

where η is the viscosity. Supercooled liquids showing Arrhenius-like behavior are classified as "strong" liquids with lower fragilities, while liquids showing non-Arrhenius behavior are classified as "fragile" liquids. Fragile liquids have higher activation energy and rapid breakdown of their configurational structure with increasing temperature near and above $T_g$, which are more difficult to form glass. FIG. 6D shows the fragilities of these samples, ranging from 44.4 to 48.8, in the middle compared with strong liquids like $SiO_2$ (19.4) and $GeO_2$ (20) and fragile liquids such as salol (phenyl salicylate, 79.4). Samples with a higher percent of ZnO tend to have higher fragility, which are harder to form glass, explained by the lower viscosity occurring in the region of crystallization in FIG. 1.

Example 6

Thermal Expansion Coefficients

Figure 7A:
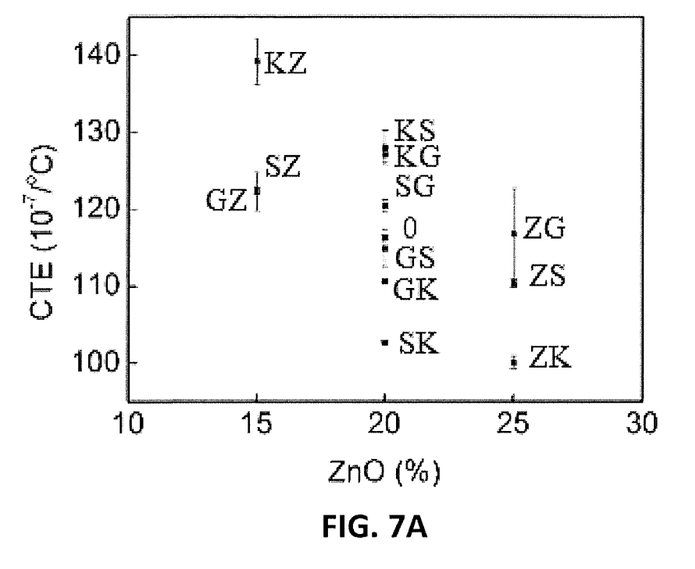
FIG. 7A is a graph of thermal expansion coefficients (CTE) obtained from Thermomechanical analyzer (TMA) testing based on different composition proportions of ZnO.
Figure 7B:
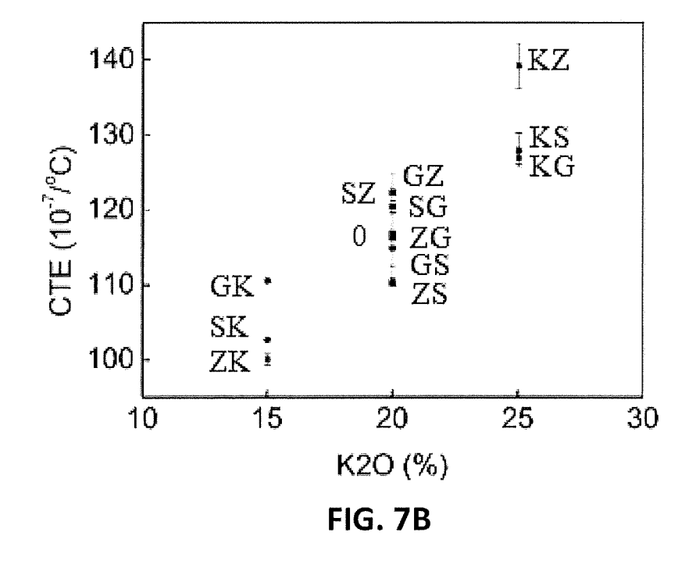
FIG. 7B is a graph of thermal expansion coefficients (CTE) obtained from TMA based on different composition proportions of $K_2O$.

FIG. 7 shows the thermal expansion coefficients (CTE) obtained from TMA based on different composition proportions of $K_2O$ and ZnO in the samples prepared in Example 1. CTE of the samples are in the range from 102.7 to $139.2\times10^{-7}/°$ C., significantly higher than that of $SiO_2$ glass ($5.5\times10^{-7}/°$ C.), mainly due to the existence of $K_2O$. The addition of alkali to the fully connected silica network breaks up the oxygen bridges, resulting in a monotonically increasing thermal expansion coefficient. Multiple linear regression was used to analyze the relation between different compositions and CTE. The equation is shown below.

$$\alpha=106.48-0.215[GeO2]-1.22[ZnO]2.215[K2O], \quad (6)$$

where α is thermal expansion coefficient, and $R^2$ equals to 0.93. P-values for ZnO and $K_2O$ are less than 0.005, while the p-value for $GeO_2$ is more than 0.5. From the multiple linear regression result, CTE rapidly increases with increasing $K_2O$ and decreasing ZnO. The negative impact of ZnO on CTE was also observed in aluminosilicate glass.

Glass samples centered around a molar composition of $20K_2O$-$20ZnO$-$40GeO_2$-$20SiO_2$ have been successfully made and composition-property relationships have been measured, including density, refractive index, transmittance, cut-off edge, glass transition behavior, and thermal expansion coefficient. The refractive index values of samples are close to that of pure $GeO_2$ glasses and significantly higher than that of soda lime silicate glasses. Lower curvature of the lens can be designed using glasses with higher refractive index.

ZnO has similar properties as MgO in the glass, including negative impact on glass-forming ability in high concentrations, indicated from the crystallized phase in the sample ZG and the increase of fragility with more ZnO. However, germanosilicate glasses containing 15-25 mol % ZnO have cut-off edges between 313 and 320 nm, significantly higher than the cut-off edge of soda lime silicate glass (157 nm), which can absorb most UV light. Furthermore, the transmittance is not influenced by the amount of ZnO. The thermal expansion coefficient decreases with increasing proportion of ZnO. The $K_2O$—ZnO—$GeO_2$—$SiO_2$ glasses presented in this paper have relatively high refractive index and good UV-shielding properties and therefore have potential applications as optical components in a variety of systems.

The invention claimed is:

1. A composition comprising a germanosilicate glass, wherein:
   the glass has a molar composition of $aK_2O$ $bZnO$-$cGeO_2$-$dSiO_2$;
   a, b, c, and d are mole percents;
   the sum of a, b, c, and d is 100;
   a is between 5 and 35;

b is between 5 and 35;
c is between 25 and 55; and
d is between 5 and 35.

2. The composition of claim 1, wherein the glass contains 10-30 mol % ZnO.

3. The composition of claim 1, wherein the glass contains 15-25 mol % ZnO.

4. The composition of claim 1, wherein:
a is between 10 and 30;
b is between 10 and 30;
c is between 30 and 50; and
d is between 10 and 30.

5. The composition of claim 1, wherein:
a is between 15 and 25;
b is between 15 and 25;
c is between 35 and 45; and
d is between 15 and 25.

6. The composition of claim 1, wherein the glass has a density of 3.1 to 3.5 g/cm$^3$.

7. The composition of claim 1, wherein the glass has a refractive index of 1.5 to 1.7.

8. The composition of claim 1, wherein the glass has a UV cut-off edge greater than 300 nm.

9. The composition of claim 8, wherein the UV cut-off edge is between 300 and 350 nm.

10. The composition of claim 1, wherein the glass has a thermal expansion coefficient of $100 \times 10^{-7}$ to $150 \times 10^{-7}$/° C.

11. The composition of claim 1, wherein the glass has an average optical transmittance from 390 to 700 nm of at least 75% at a thickness of 2 mm.

12. The composition of claim 11, wherein the glass has an average optical transmittance from 390 to 700 nm of 80 to 90% at a thickness of 2 mm.

13. The composition of claim 1, wherein the glass has an optical reflectance of no greater than 0.07, when determined according to Equation (3).

14. The composition of claim 13, wherein the glass has an optical reflectance of 0.05 to 0.06, when determined according to Equation (3).

15. The composition of claim 1, wherein the glass has a glass transition temperature ($T_g$) of 450-600° C., when determined according to the Mauro-Yue-Ellison-Gupta-Allen (MYEGA) equation.

16. The composition of claim 1, wherein the glass has a fragility (m) of no greater than 50, when determined according to Equation (5).

17. The composition of claim 16, wherein the glass has a fragility of 40 to 50, when determined according to Equation (5).

18. The composition of claim 1, wherein the glass has a melting temperature of 1400-1600° C. ($T_{melt}$) and/or an annealing temperature ($T_{anneal}$) of 450-600° C.

19. The composition of claim 1, wherein the glass has:
a density of 3.1 to 3.5 g/cm$^3$;
a refractive index of 1.5 to 1.7;
a UV cut-off edge greater than 300 nm;
a thermal expansion coefficient of $100 \times 10^{-7}$ to $150 \times 10^{-7}$/° C.;
an average optical transmittance from 390 to 700 nm of at least 75% at a thickness of 2 mm;
an optical reflectance of no greater than 0.07, when determined according to Equation (3);
a glass transition temperature ($T_g$) of 450-600° C., when determined according to the Mauro-Yue-Ellison-Gupta-Allen (MYEGA) equation;
a fragility (m) of no greater than 50, when determined according to Equation (5);
a melting point of 1400-1600° C. ($T_{melt}$); and
an annealing temperature ($T_{anneal}$) of 450-600° C.

20. The composition of claim 1, wherein the glass has a refractive index of 1.5 to 1.7.

21. The composition of claim 1, wherein the glass has a UV cut-off edge between 300 and 350 nm.

* * * * *